Sept. 21, 1965    P. M. MORSE    3,207,425
ROLLING BODY ENGINE WITH MULTIPLE ROTORS
Filed March 22, 1965    6 Sheets-Sheet 1
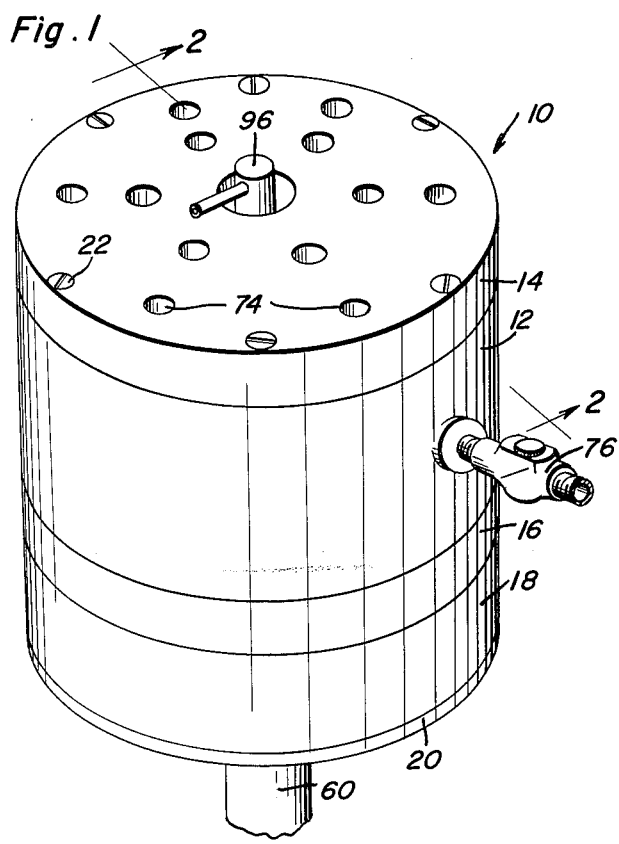
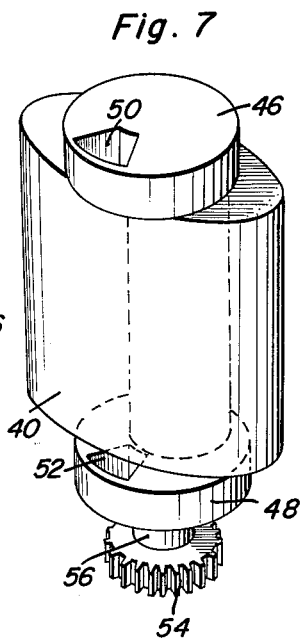
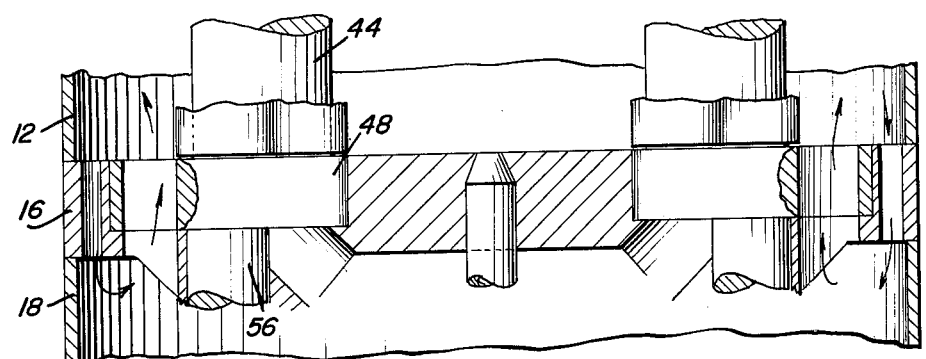
Paul M. Morse
INVENTOR.

Sept. 21, 1965  P. M. MORSE  3,207,425
ROLLING BODY ENGINE WITH MULTIPLE ROTORS
Filed March 22, 1965  6 Sheets-Sheet 2
Fig. 2
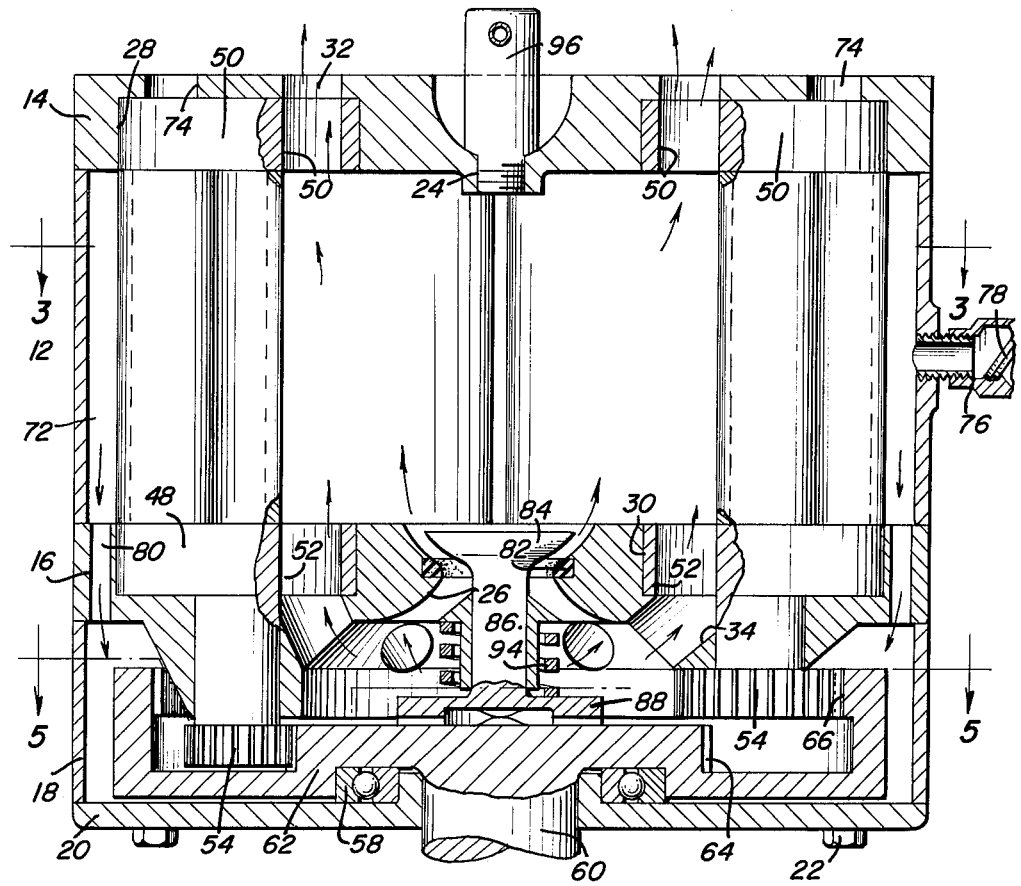
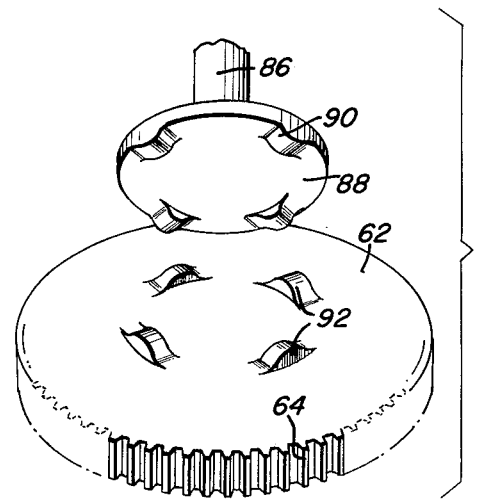
Fig. 8
Paul M. Morse
INVENTOR.
BY
Attorneys Sept. 21, 1965 P. M. MORSE 3,207,425

ROLLING BODY ENGINE WITH MULTIPLE ROTORS

Filed March 22, 1965 6 Sheets—Sheet 3

Paul M. Morse
INVENTOR.
BY *Clarence A. O'Brien*
*and Harvey B. Jacobson*
Attorneys Sept. 21, 1965 P. M. MORSE 3,207,425
ROLLING BODY ENGINE WITH MULTIPLE ROTORS
Filed March 22, 1965 6 Sheets-Sheet 4
Fig. 5
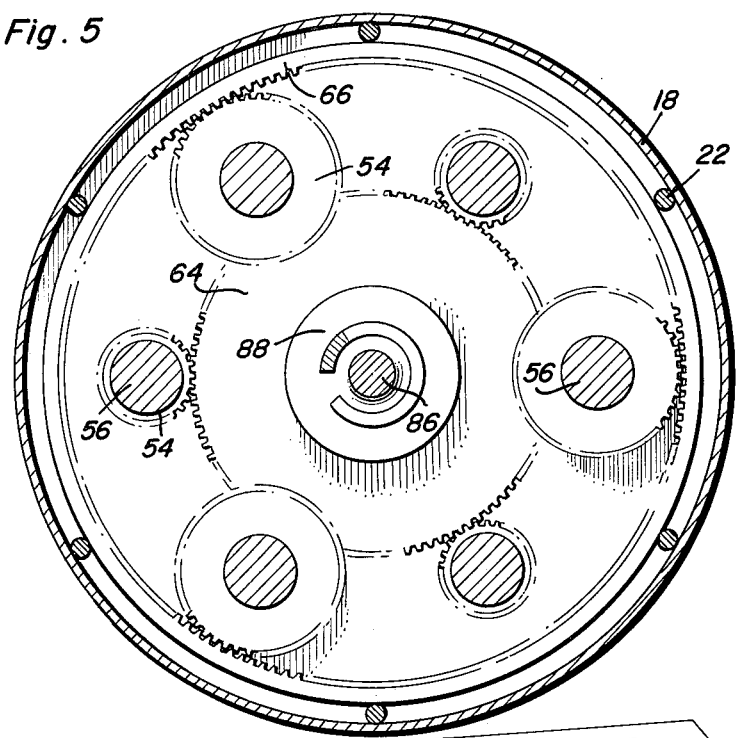
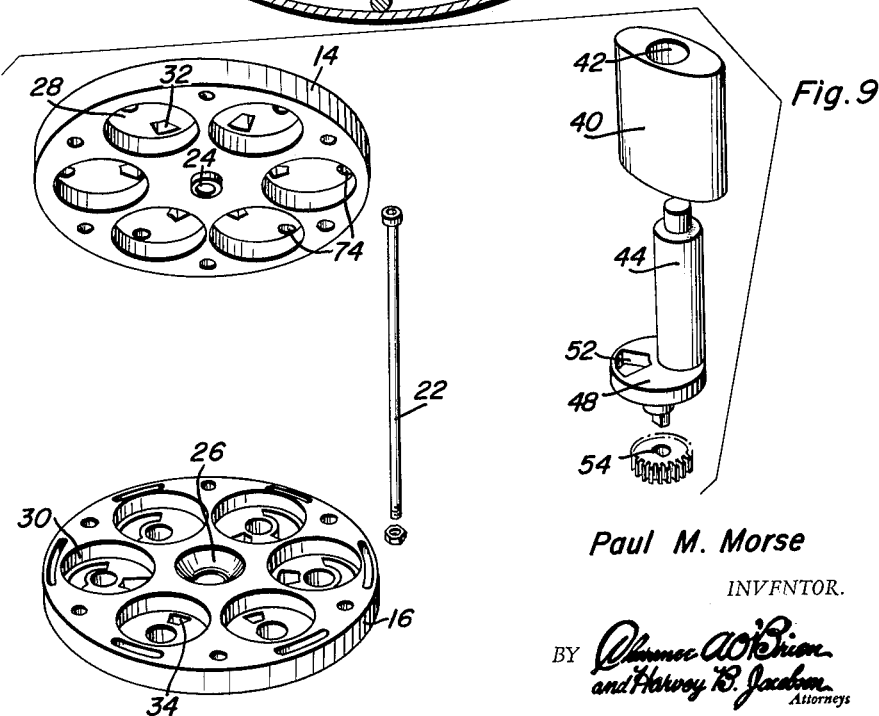
Fig. 9
Paul M. Morse
INVENTOR.
BY Sept. 21, 1965 P. M. MORSE 3,207,425
ROLLING BODY ENGINE WITH MULTIPLE ROTORS
Filed March 22, 1965 6 Sheets-Sheet 5

Paul M. Morse
INVENTOR.

BY *Clarence A. O'Brien*
and *Harvey B. Jacobson*
Attorneys

Paul M. Morse
INVENTOR.

United States Patent Office

3,207,425
Patented Sept. 21, 1965

3,207,425
ROLLING BODY ENGINE WITH MULTIPLE ROTORS
Paul M. Morse, Carlinville, Ill., assignor of thirty-three percent to John E. Morse, Eureka, Calif.
Filed Mar. 22, 1965, Ser. No. 441,718
12 Claims. (Cl. 230—141)

This invention comprises a novel and useful rolling body engine with multiple rotors and relates generally to an expansible chamber device of the type wherein a positive expansion and contraction of a working chamber is effected by a continuous unidirectional rotation of a plurality of rotary piston vanes.

As will become subsequently apparent the basic principle of operation of this invention, consisting in the cyclic positive expansion and contraction of a working chamber through the agency of and as defined by a plurality of continuously rotating piston vanes having a continuous rolling engagement with each other and with adjacent vanes rotating oppositely, is applicable to all types of apparatus which utilize a positive displacement, expansible and contractible chamber such as meters, fluid motors, pumps and expansible fluid engines including internal combustion engines.

More specifically, however, as an exemplification of a preferred manner of practicing the principles of the invention, there are disclosed herein two forms of internal combustion engines.

It is the primary puropse of this invention to provide an expansible chamber device of the positive displacement type which shall eliminate the disadvantages of wear and inertia inherent in apparatuses of the reciprocating piston type and to substitute therefor the advantages of constantly and unidirectionally rotating piston elements.

Another object is to provide an apparatus having therein a compartment which is divided into positive displacement, cyclically expansible and contractible inner and outer working chambers by the continuous and unidirectional rotation of a plurality of circumferentially spaced axially extending rotary piston vanes.

A further object of the invention is to provide an internal combustion engine in accordance with the preceding object in which the incoming fuel or combustible mixture and fluid shall be sprayed against the hot surfaces of the rotating vane elements of the engine to effectively cool the latter and to preheat the fuel charge thereby promoting the thermal efficiency of the engine.

A further object of the invention is to provide an internal combustion engine in accordance with the preceding objects which shall possess unusually large and efficient port areas for the introduction of fluids thereinto from a transfer passage means and for the discharge of fluids from the working chambers thereof.

Yet another object of the invention is to provide an engine in accordance with the above mentioned objects having a greatly simplified valve system for controlling the inlet, exhaust and transfer of fluids between an outer compression chamber on one side of the rotary piston vanes and an inner combustion chamber on the inner side of the piston vanes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a first embodiment of the invention consisting of an internal combustion engine of the diesel type;

FIGURE 2 is a view in vertical central section taken upon an enlarged scale substantially upon the plane indicated by the section line 2—2 of FIGURE 1 with parts being broken away and shown in section and other parts being shown in elevation;

FIGURE 5 is a horizontal sectional view taken upon a reduced scale substantially upon the plane indicated by the section line 5—5 of FIGURE 2 and showing the drive gearing for the crankshafts of the piston vanes and the valve plates of the engine;

FIGURE 6 is an enlarged detail view in vertical transverse section through one of the valving plates of the engine and showing the opening of the transfer passage ports of the engine;

FIGURE 7 is a perspective view of one of the rotary vanes and its mounting upon the crankshaft associated therewith and the cooperating valve plates of that crankshaft.

FIGURE 8 is a group perspective view of a portion of an inlet valve and its control means for the combustion chamber of the engine;

FIGURE 9 is an exploded perspective view of a crankshaft and its drive gear, a valve plate, the rotary piston vane journaled upon the crankshaft and the cooperating valved end walls of the engine;

Figure 3:
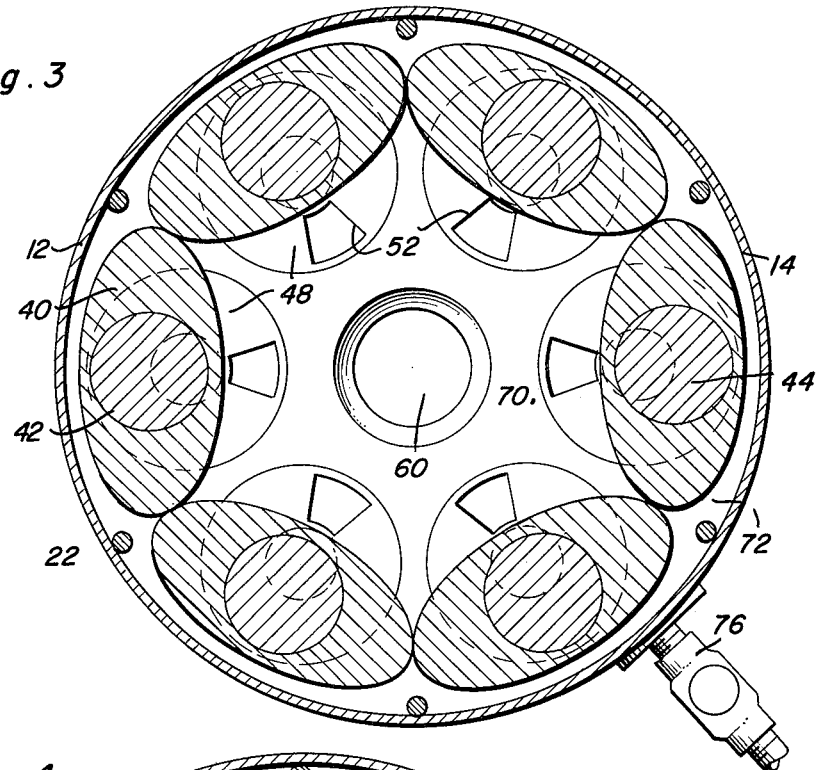
FIGURES 3 and 4 are views in horizontal section taken upon a reduced scale substantially upon the plane indicated by the section line 3—3 of FIGURE 2 with the position of the parts being shown at a 90° interval of rotation of the piston vanes.
Figure 4:
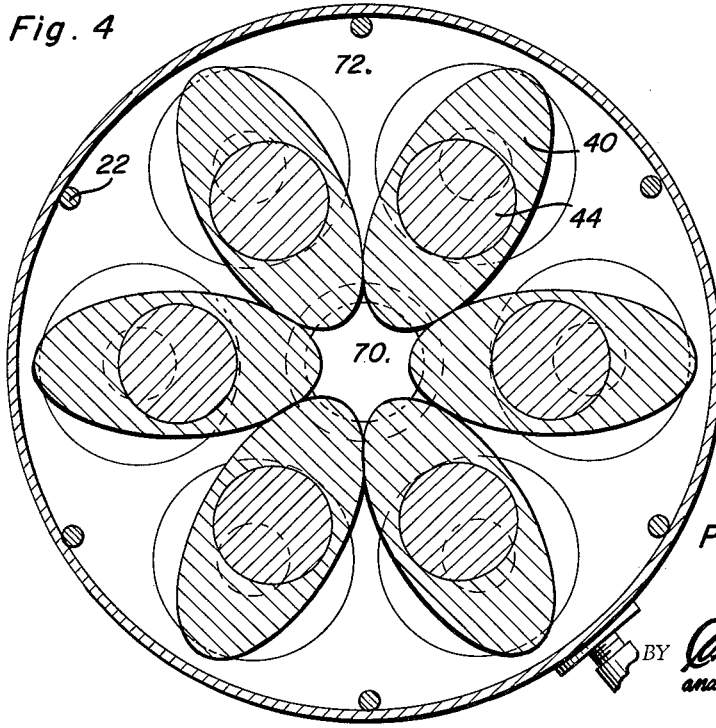

Referring first to the embodiment of FIGURES 1–9, it will be observed that the diesel type of internal combustion engine illustrated therein is indicated generally by the numeral 10 and is of a generally cylindrical configuration consisting of a main stator portion 12 having a pair of end walls 14 and 16 secured thereto and with a further cylindrical extension in the form of a housing 18 provided with a closure plate 20, all joined together as by removable through bolts 22. The main stator section 12 is preferably a hollow cylinder whose interior forms a compartment in which are housed the rotor elements of the apparatus. The opposite ends of the sections 12 are closed by the end walls 14 and 16. As will be apparent from FIGURES 2 and 9, the end walls 14 and 16 are provided with central openings 24 and 26 while disposed circumferentially thereabout are a series of recesses or pockets 28 for the end plate 14 and 30 for the other end plate 16. Ports 32 extend through the end plate 14 and into each of the recesses or pockets 28, while further ports 34 similarly are provided in the end plates 16. Received within the compartments defined by the cylindrical stator section 12 and two end plates 14 and 16 are a plurality of rotary piston vanes 40. Referring to FIGURES 3 and 4 in conjunction with FIGURE 7 it will be observed that each of these vanes is an axially elongated body which is elliptical in cross-section and is provided with a passage or bore 42 extending axially therethrough. By means of the bore 42, the rotary piston vane 40 is freely rotatably journalled upon the throw 44 of a crankshaft. Each vane 40 extends between and slidably engages the two opposite end walls 14 and 16 and thus extends the entire axial extent of the compartment within the stator section 12. Mounted upon the crankshaft are a pair of valve plates in the form of disks 46 and 48 respectively received in the pockets 28 and 30 in the two end plates 14 and 16. Each valve plate 46 and 48 has a valve port 50 and 52 respectively therein which cooperates with the recess ports 32 and 34. The valve plates 46 and 48 are fixedly secured to the crankshaft for rotation therewith in any suitable manner not shown. Secured to the end of the crankshaft is a gear 54. The gear 54 is carried by the extremity 56 of the crankshaft in any suitable manner, as shown in FIGURES 2 and 6, each crankshaft portion 56 and its gear 54 extending beyond the end plate 16 and into the gearing housing 18 for a purpose to be subsequently set forth.

Journalled in the closure plate 20 as by means of journal bearings 58 is a power or driveshaft 60 of the engine and which within the gear housing is provided with a cylindrical plate 62. The latter is provided with an external ring gear 64 and with a further internal ring gear 66 of greater diameter than the gear 64 and spaced axially therefrom. The crankshafts of alternate piston vanes are of different lengths. Thus, one set of such crankshafts is longer so that its gear 54 may engage the external ring gear 64 while the other set of crankshafts is shorter so that each gear 54 may engage the internal ring gear 66, the arrangement being as shown in FIGURE 2. The gear ratios of the gears 64, 66 and the associated crankshaft gear 54 are so selected that alternate rotary piston vanes 40 are caused to rotate at the same speed but in opposite directions in accordance with a given direction of rotation of the power shaft 60.

Referring now especially to FIGURES 3 and 4 it is to be understood that the rotary piston vanes 40 are disposed in circumferentially spaced relation about the interior of the stator section 12 and are of such size that adjacent vanes would have a rolling engagement with each other throughout continuous unidirectional rotation of the vanes. It will thus be seen that in response to such rotation and arrangement of the vanes, six being deemed a preferable number for the purpose of this invention, the compartment within the stator section 12 is thus divided into an inner working chamber 70 and an outer working chamber 72. When the device functions as an internal combustion engine, the inner working chamber 70 constitutes an explosion chamber or an internal combustion chamber of an internal combustion engine, while the outer working chamber comprises a pre-compression chamber or compressor chamber for the apparatus. Each of these chambers is thus of the positive displacement type and is cyclically operable for expansion and contraction during the rotation of the piston vanes.

If desired, a suitable sealing means may be provided for the adjacent rolling surfaces of the vanes 40 and also between the latter and the two end plates 14 and 16 to establish a fluid tight seal therebetween. Inasmuch as the details of structure and operation of the sealing means may be varied as desired and in themselves form no part of the invention set forth and claimed herein, and are well understood by those skilled in the art, a further description thereof is deemed to be unnecessary.

Owing to the free floating mounting of the vanes 40 upon the crank throws 44, the rotation of the latter will progressively move the vanes inward and outward of their working chambers. During this movement the continuous rolling engagement of adjacent, oppositely rotating vanes will maintain contact with each other with the vanes rotationally adjusting themselves upon their cranks to maintain such contact. If desired, however, a direct geared connection between the vanes themselves may be utilized to maintain the desired continuous contact of their surfaces.

As the crankshafts rotate, the valve plates 46 and 48 fixed thereto and their respective valve ports 50 and 52 will successively register in timed relation with the ports 32 and 34 in the end plates 14 and 16. The relationship of these registering ports will be apparent from the diagrammatic view of FIGURE 10.

In the diesel construction of FIGURES 1–9, air is introduced into the outer supercharger or compressor chamber 72 through primary air inlet ports 74, and if desired, through one or more auxiliary air inlet ducts 76. The arrangement insures a great volume of incoming air which not only supports the air charge to be compressed as a component of the explosive mixture for the combustion chamber 70 but also serves to effectively cool the internal surfaces of the engine, especially in the region of the exhaust ports.

The auxiliary air inlet ducts 76 are provided with any suitable type and construction of non-return air inlet valve such as that shown at 78 in FIGURE 2.

The main air inlet ports 74, on the other hand, extend through the end plate 14 into the recesses or chamber 28, see FIGURES 1, 2 and 9 whereby they are controlled by the valving action of the valve disks 46. This arrangement effectually cools the valve disks 46 which also control the discharge of exhaust gases through the exhaust ports 32.

From the compression chamber 72 the compressed air is conveyed by a series of passages 80 to the end plate 16 and into the gearing housing 18 as shown by the arrows in FIGURE 2. From thence the compressed air enters the combustion chamber through the previously mentioned ports 34 and the passages 52 in the air inlet control valve plates 48 into the combustion chamber. When the cycle of operation is completed in the working chamber 70, the products of combustion are discharged therefrom through the valve ports 50 in the valve disks 46 and the ports 32 in the end plate 14, this constituting the exhaust passage means of the engine.

In addition, air is also admitted from the interior of the housing 18 into the combustion chamber through the previously mentioned central passage 26 in the end plate 16. For this purpose, this central passage is provided with a ring 82 comprising a valve seat upon which is seatable a poppet valve head 84 having a valve stem 86 and a valve actuator foot 88 thereon provided with a series of cam lugs 90 cooperated with corresponding cam actuating lugs 92 formed upon the top surface of the plate 62. A valve spring 94 encircling the valve stem 86 yieldingly retains the valve stem foot 88 in contact with the actuating cams. Thus, upon rotation of the power shaft 60, the valve 84 is opened admitting, in timed relation, to the position of the rotary piston vanes, a charge of compressed air from the compressor chamber 72 into the combustion chamber 70.

Any conventional form of fuel injecting device such as the fuel injection nozzle 96 is threadedly engaged in the bore 24 in the end plate 14 in axial alignment with the air inlet into the working chamber by means of the valve 84 or the valve ports 52. Thus, there is provided a uniflow of the compressed air into and exhaustion of the combustion products from the combustion chamber of the engine.

A very important feature of this invention is the thermal efficiency of the operation of the rotor vanes 40 in both the combustion chamber and the compressor chamber of the engine. During each rotation of a vane it will be evident that one side thereof is exposed to the combustion chamber while the other side is exposed to the compression chamber. Thus, the heat of the combustion being absorbed by one face of a vane is disseminated by contact of that face with the relatively cool air in the compressor chamber when the vane is moved 180° in rotation. Further, the injection of the fuel into the combustion chamber impinges upon the heated surfaces of the rotor vanes thereby further facilitating vaporization of the fuel mixture as well as cooling these vanes.

Figure 11:
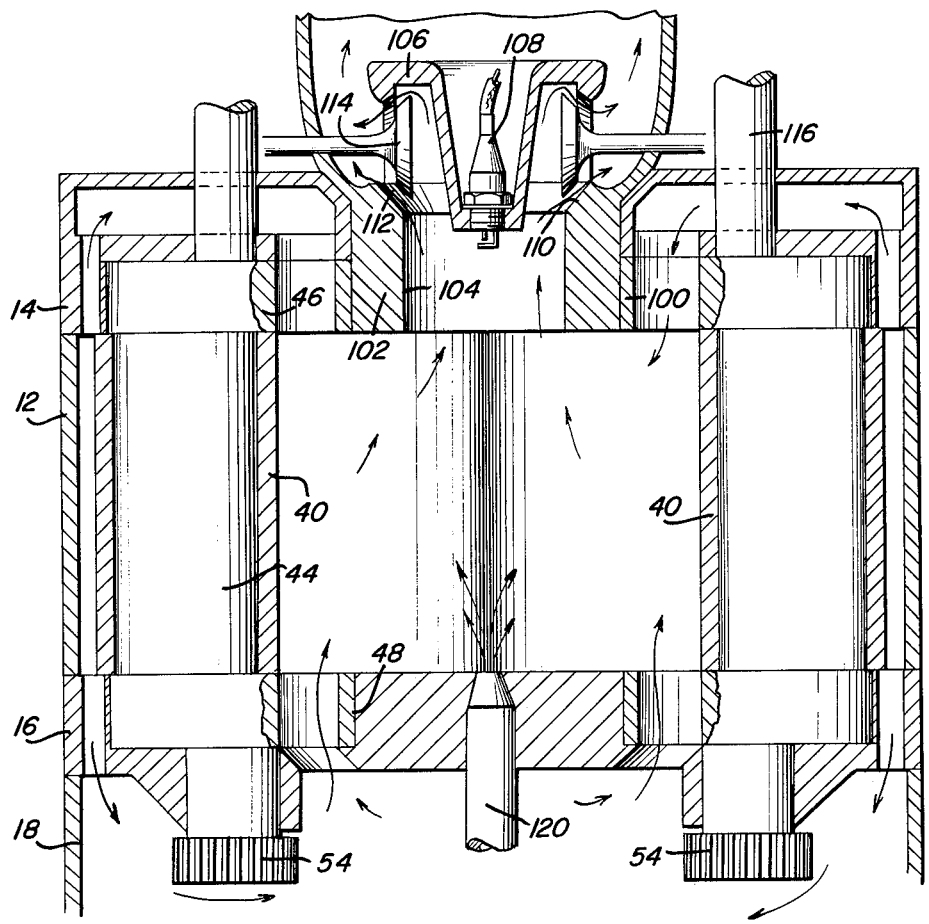
FIGURE 11 is a view similar to FIGURE 2 but showing a second embodiment of engine operating with a carbureted fuel mixture.

Referring next to the carbureted mixture engine embodiment of FIGURE 11, it will be observed that the same general arrangement of parts is shown. Thus the same stator casing section 12 with the end plates 14 and 16 and the gear housing 18 as previously described are utilized together with a same crankshaft arrangement including the crank throws 44 having the rotary piston means 40 freely revolubly mounted thereon together with the upper and lower valve disks 46 and 48 with the same valve port arrangements and seated in the same valve recesses. Further, the crankshafts of the rotary piston vanes are driven by gears 54 in the same manner previously described.

However, the end plate 14 is provided with an axial bore or passage 100 therethrough in which is received the sleeve 102 of a valve member. This sleeve is provided with a central passage 104 therethrough communicating with the interior of the combustion chamber of the engine and having a removable and re-entrant head 106 at its outer end receiving a spark plug 108 connected to any suitablbe ignition system, not shown. Further, a series of exhaust valve ports 110 are disposed in the sides of the member 102 surrounding the re-entrant head portion contained in the spark plug 108 and these ports are provided with seats 112 controlled by exhaust poppet valves 114. These valves may be cyclically operated in any suitable manner by any suitable mechanism, as for example by being operatively connected to and driven by the projecting extremities 116 of the crankshafts through suitable connecting mechanisms, not shown.

The carburetor fuel mixture of any suitable source, is discharged into the combustion chamber of the engine as by means of a fuel inlet nozzle 120 disposed centrally of the end plate 16 and connected to any suitable charge forming device which in itself forms no part of the present invention.

The basic principle of construction and operation of the compressor and working chambers, with air being compressed in the outer compressor chamber and delivered in the same manner as described in connection with the preceding embodiment into the combustion chamber is utilized. The inlet of the pre-compressed air into the combustion chamber from both ends of the latter results in increased turbulence which beneficially effects the adequate mixing of the fuel, from a carburetor charge or liquid injection from a nozzle in the diesel engine.

Figure 10:
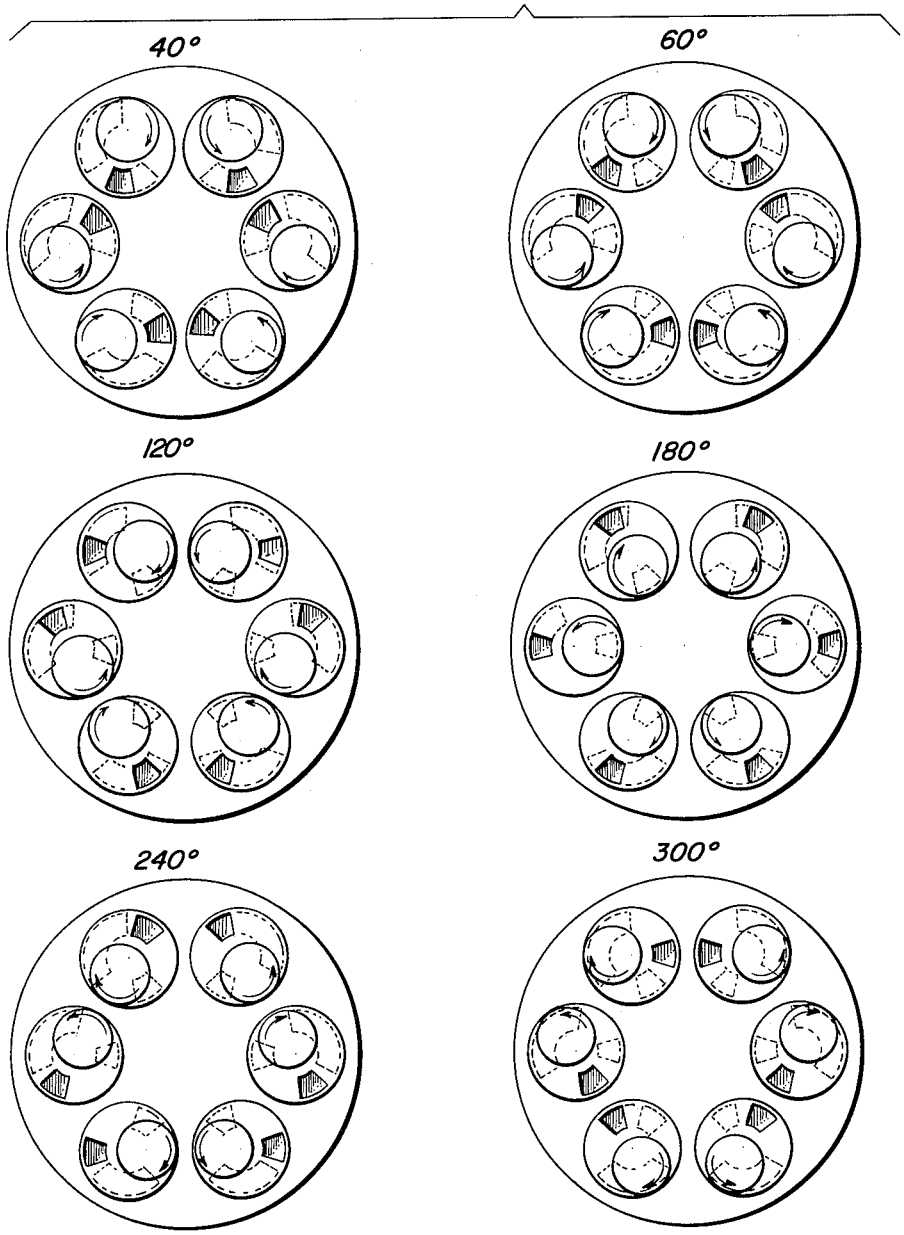
FIGURE 10 is a sequential diagrammatic view showing the cyclic operation of the valve mechanism of the engine.

The diagrammatic view of FIGURE 10 diagrammatically illustrates the operation of one set of the valve disks and their corresponding registration with the valve ports of the corresponding end plate throughout one revolution of the crankshafts and the rotary vane pistons of the engine.

However, inasmuch as the invention set forth herein and claimed hereinafter is not dependent upon any particular valve mechanism or valve operation, a further description thereof is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. An expansible chamber device of the rotary vane type comprising a stator having a cylindrical side wall together with end walls enclosing a cylindrical compartment, a plurality of axially extending vanes of elliptical cross-section revolubly mounted in circumferentially spaced side-by-side relation and dividing said compartment into outer and inner oppositely varying working chambers, means mounting said vanes for rotation about their respective axes with a continuous rolling engagement of their surfaces, means causing unidirectional rotation of said vanes with adjacent vanes revolving oppositely and effecting successive expansion and contraction of said working chambers, means for intaking and compressing fluid in said outer chamber during its expansion and contraction, means transferring fluid compressed in said outer chamber during contraction thereof to said inner chamber and means exhausting fluid from said inner chamber in timed relation to its cyclic operation.

2. The combination of claim 1 wherein said mounting means comprises a crankshaft for each vane with each vane being mounted upon and revolvable with the crank throw of a crankshaft.

3. The combination of claim 2 wherein said rotation causing means comprises a power shaft with a pair of ring gears thereon, said vanes having pinions with the pinions of adjacent vanes engaging different ring gears.

4. The combination of claim 1 wherein said transfer means comprise valve plates each carried by and rotatable with a vane and said valve plates having ports communicating with said outer chamber and controlling fluid flow therefrom into said inner chamber.

5. The combination of claim 4 wherein each vane has a valve plate at each end thereof, said transfer means discharging into opposite ends of said inner chamber.

6. The combination of claim 1 wherein said mounting means comprises a plurality of crankshafts rotatably journaled in said stator and each having a crank throw upon which a vane is freely and rotatably journalled.

7. The combination of claim 6 wherein said rotation causing means comprises a power shaft having concentric inner and outer ring gears thereon, said crankshaft having each a pinion engaging one of said ring gears with the pinions of adjacent crankshafts engaging different ring gears.

8. The combination of claim 7 including a housing enclosing said ring gears and pinions, said transfer means communicating with said housing.

9. The combination of claim 1 wherein said rotation causing means comprises a crankshaft having a disk, said vanes being each operatively connected to said disk for transmission of rotary movement therebetween, said transfer means including a valve controlling flow from said outer chamber into said inner chamber, together with valve actuating cams on said disk drivingly engaging said valve.

10. An internal combustion engine comprising a stator having a cylindrical side-wall together with end walls enclosing a cylindrical compartment, a plurality of axially extending vanes each of elliptical cross-section and revolubly mounted in said compartment in circumferentially spaced side-by-side relation and dividing said compartment into an inner combustion chamber and an outer compression chamber, means mounting said vanes for rotation about their respective axes with adjacent vanes having continuous but opposite unidirectional rotation with their surfaces in continuous rolling engagement thereby effecting successive positive expansion and contraction of the combustion and compression chambers oppositely, means admitting fluid for precompression into said outer chamber, means transferring precompressed fluid from said outer chamber to said inner chamber, means for producing and igniting a combustible mixture of fuel and air in said combustion chamber, means for exhausting combustion products from said combustion chamber.

11. The combination of claim 10 wherein said transfer means includes passages introducing a compressed fluid from both ends of said compression chamber into the respective ends of said combustion chamber.

12. The combination of claim 11 wherein said exhaust means is at one end of said combustion chamber and said transfer means includes passages opening into the other end of said combustion chamber whereby to effect straight line flow therethrough.

References Cited by the Examiner

UNITED STATES PATENTS

| | | | |
|---|---|---|---|
| 710,756 | 10/02 | Colbourne | 91—87 |
| 1,349,882 | 8/20 | Homan | 123—12 |
| 1,874,239 | 8/32 | Cannizzaro | 91—89 |
| 2,097,881 | 11/37 | Hopkins | 103—126 |
| 2,410,341 | 10/46 | Delamere | 103—117 |

FOREIGN PATENTS 483,929   4/38   Great Britain.

DONLEY J. STOCKING, *Primary Examiner.*